US005534212A

United States Patent [19]
Chokappa et al.

[11] Patent Number: 5,534,212
[45] Date of Patent: Jul. 9, 1996

[54] PROCESS FOR THE MANUFACTURE OF SOAP BARS AND APPARATUS FOR USE IN SAME PROCESS

[75] Inventors: Kalyansundaram D. Chokappa; Vijay M. Naik, both of Bombay, India

[73] Assignee: Lever Brothers Company, Division of Conopco,Inc., New York, N.Y.

[21] Appl. No.: 386,798

[22] Filed: Feb. 10, 1995

[30]     Foreign Application Priority Data

Feb. 15, 1994 [GB] United Kingdom ............... 9402837

[51] Int. Cl.⁶ ................................................. B29C 47/40
[52] U.S. Cl. .................... 264/211.11; 510/150; 510/152; 510/153; 510/155; 510/156; 510/447; 510/450; 264/142; 264/211.23; 264/323; 264/349; 425/204
[58] Field of Search ........................... 264/211.11, 176.1, 264/349, 141, 211.23, 142, 323; 425/204, 202, 376.1; 252/134

[56]             References Cited

U.S. PATENT DOCUMENTS

| | | | |
|---|---|---|---|
| 2,048,286 | 7/1936 | Pease | 366/85 |
| 2,563,396 | 8/1951 | Colombo | 425/204 |
| 3,497,912 | 3/1970 | Fischer | 425/204 |
| 3,891,365 | 6/1975 | Fischer | 425/205 |
| 4,141,947 | 2/1979 | Fischer et al. | 264/148 |
| 4,510,110 | 4/1985 | Mazzoni | 264/211.11 |
| 4,634,564 | 1/1987 | Kerslake | 264/75 |
| 4,913,641 | 4/1990 | Zahradnik | 425/205 |
| 5,156,794 | 10/1992 | Nakanishi et al. | 425/202 |
| 5,350,231 | 9/1994 | Eigruber | 425/204 |
| 5,364,575 | 11/1994 | Doom, Sr. et al. | 264/211.11 |

FOREIGN PATENT DOCUMENTS

| | | | |
|---|---|---|---|
| 2139003 | 3/1972 | Germany | 264/141 |
| 2111424 | 7/1983 | U.S.S.R. | 425/209 |

OTHER PUBLICATIONS

*Twin Screw Extrusion*, Janssen, pp. 6–7, Elsevier Scientific Publ. Co., 5–1980.

*Primary Examiner*—Jeffery R. Thurlow
*Attorney, Agent, or Firm*—Ronald A. Koatz

[57]             ABSTRACT

The invention provides a process for the manufacture of soap forms which includes the step of treating a soap feedstock by passage through a twin screw, intermeshing, counter-rotating extruder and apparatus for the manufacture of soap forms according to the process, said apparatus containing a twin screw, intermeshing, counter-rotating extruder, wherein the extruder includes two oppositely-threaded, closely intermeshing screws, the screws being non-matching and such that the ratio of the length to the diameter is greater than 1:1, mounted for rotation within a barrel having a first end and a second end, said screws having a minimal screw-to-screw and screw to barrel clearance such that as the feedstock passes along at least a part of the barrel from said first end and towards said second end it is divided into a plurality of discrete, substantially C-shaped segments bounded by the screw and barrel surfaces and conveyed in a path whereby the bulk of the feedstock move substantially parallel to the rotational axis of the screws.

8 Claims, 6 Drawing Sheets

SOAP A

SOAP A

PROCESS FOR THE MANUFACTURE OF SOAP BARS AND APPARATUS FOR USE IN SAME PROCESS

FIELD OF THE INVENTION

This present invention relates to improvements relating to a process for the manufacture of soap forms and apparatus for use in said process. The invention is particularly concerned with improvements to the so-called soap 'plodder' and to a process which used an improved plodder. While the invention is described with particular reference to the manufacture of soap bars it should be understood that the term 'soap' extends to materials comprising non-soap surfactants, including synthetic surfactants and the term 'forms' extends to other three-dimensional solid forms including soap bars, billets, tablets and so called noodles.

BACKGROUND

The starting material for the production of soap bars or billets is a mixture containing surfactants, other functional ingredients and water at appropriate proportions. Depending upon the composition of this mixture, its rheological and processing characteristics vary a great deal.

Generally, processing/finishing of such a mixture involves various process steps such as homogenisation, shear working, and forming into a required shape.

One of the devices very commonly employed to carry out one or more of the above operations is a plodder.

The function of a simple plodder is to form the mixture into bars or billets of required cross-sections which may subsequently be cut into smaller bars or stamped into tablets of required shape by suitable other means.

The function of a refiner plodder is to clean the mixture free of gritty particles or impurities and additionally homogenise/shear work the same to achieve the required degree of homogeneity or phase structure. The plodders may also be used to convert loose aggregates/chips/flakes into pellets or noodles for intermediate storage or for feeding subsequent process operations.

The heart of a plodder assembly is a screw extruder. The simplest plodder has an extruder with a single screw. The feed stock, either in homogenised and worked form or in the form of pellets, noodles, crimpled chips or (recycled) bars fed through the hopper enters the extruder barrel and fills the annular space between the extruder worm (screw) and the barrel. The barrel is stationary and the worm rotates inside the barrel. Frictional/viscous drag forces act on the material, both at the barrel as well as at the worm surfaces. The resultant force is responsible for the forward transportation of the processed mass like a rotating nut on a stationary screw towards the discharge end. At the discharge end, the extruder may have a perforated plate, through which, the processed mass is forced. This is generally known as the 'noodle' plate. The processed mass emerges in the form of rods/ribbons/sheets from the perforated plate.

If the objective is to produce chopped noodles or pellets for intermediate storage or to serve as a feed for subsequent process step then a suitable cutter is provided at the discharge end to chop the extrudates into smaller pieces. If the objective is to enhance homogenisation or shear working or to filter out gritty particles, then it is advantageous to fit a wire gauze in front of the perforated plate but it tends to reduce throughput. If the objective is to form the mixed mass into billets or bars, then a cone and die/eye plate are provided at the discharge end of the extruder along with or without the perforated plate. The extruder forces the mixed mass through these end fittings to produce the billets or bars. Designs of perforated plates, cones and die/eye plates vary considerably from application to application.

Machines called duplex or twin worm plodders have two worms (or screws) which are parallel, non-intermeshing and mounted tangentially with respect to each other within a barrel. The worms may be co-rotating but usually they are counter-rotating. Intermeshed and co-rotating twin screw extruders are also known for processing of soap/detergent mass. In the case of both non-intermeshed duplex plodders as well as the intermeshed co-rotating twin screw extruders, drag forces similar to those encountered in single worm plodders act on the processed mass and push the same in the forward direction.

Screw extrusion is apparently a simple operation, but the results in terms of quality of product, throughput rate, specific energy consumption, etc. can be influenced by a number of factors in a rather complex way. Generally, plodding is affected by soap factors and by machine factors. It is important to balance the various factors so as to achieve the best results. As the processed material moves forward, it gets heated up as a result of frictional and shear heat generation. Considerable structural breakdown may also take place in the case of some formulations. In certain instances, the heat generated raises the temperature of the processed mass above desirable limits thereby adversely affecting certain properties of the soap. The following are a few disadvantages of the hitherto known soap finishing processes employing single worm plodders, duplex plodders and intermeshed co-rotating extruders:

1. The throughput rate is very sensitive to the resistance offered by wire mesh screens, perforated plates, cones and dies.

2. The processed material being transported may be subjected to excessive shear which may result in rheological damage and temperature rise. These may lead to deterioration of user properties as well as softer extruded forms which may cause complications in downstream processing. The excessive and wasteful shear dissipation may also lead to lower energy efficiency.

3. It is necessary to employ a refrigerated coolant with less than 15° C. preferably less than 10° C. temperature for cooling the barrel to achieve acceptable temperature control of product and pumping characteristics. This requirement results in an additional investment in a refrigeration plant and additional operating expenditure.

4. The transport characteristics of the conventional extruders are very sensitive to the rheology of the processed material. The rheology of soap/detergent bars in turn is very sensitive to their formulations. Therefore there are several restrictions on formulations that can be processed satisfactorily. These restrictions severely limit manufacture of soap/detergent bars with improved/novel functional benefits such as skin emoliency, moisturisation, etc. which can be achieved through formulation changes involving use of alternative detergent actives, such as alkyl isethionates, functional ingredients, such as skin benefit agents, for example fatty acids, mineral and paraffin oils and silicones.

In the history of plodded soap bars, which is larger than half a century, equipment manufacturers as well as manufacturers of soap bars have investigated and developed plodder worms with different design features and parameters none of which are able to adequately reduce the above disadvantages.

An object of the present invention is to minimise, and preferably avoid, the above disadvantages.

BRIEF DESCRIPTION OF THE INVENTION

We have now determined that some or all of the above-mentioned disadvantages can be overcome by the use of twin screw, intermeshing, counter-rotating extruder where the screws are non-matching and their length to diameter is greater than 1.

Thus, according a first aspect of the present invention there is provided a process for manufacture of soap forms which includes the step of treating a soap feedstock by passage through a twin-screw, intermeshing counter-rotating extruder in which the screws are oppositely threaded, non-matching and the ratio of the length to the diameter of the screws is greater than 1:1.

A second aspect of the present invention provides apparatus for the manufacture of soap forms according to the process as claimed in the subject invention, said apparatus comprising a twin-screw, intermeshing counter-rotating extruder in which the screws are oppositely threaded, non-matching and the ratio of the length to the diameter of the screws is greater than 1:1.

Such a treatment increases throughput rate at any rotational speed, minimises the dependence of throughput rate on rheology of the feed stock and coolant circulation, minimises rheological damages and temperature rise in the product, and also minimises specific power requirements to operate the extruder.

By 'non-matching' screws is meant that, during use, the screws in the extruder are not mirror images of each other. This may be achieved by ensuring the trailing flank of the flight of one screw is in close proximity with the adjacent leading flank of the flight of the second screw.

Typically the extruder comprises two oppositely-threaded, closely intermeshing screws mounted for rotation within a barrel, the barrel having a first feed end and a second discharge end, said screws having a minimal screw-to-screw and screw-to-barrel clearance such that as the feedstock passes along at least a part of the barrel from said first end towards said second end it is divided into a plurality of discrete, substantially C-shaped segments bounded by the screw and barrel surfaces and conveyed into a path whereby the bulk of the feedstock moves substantially parallel to the rotational axis of the screws.

The extruder for carrying out the above method may comprise a barrel housing a pair of intermeshed screws arranged to self-wipe one another. One end of said barrel is provided with means for feeding the material into the barrel. The second end of the barrel is provided with means for forming the material into soap forms.

The screws are detachable from the extruder and whenever necessary can be changed with another pair of screws having different screw layout. The screw may be either continuous or segmented. The segmented screws have removable sections which can have varying pitches so that they can be manipulated depending upon the composition of the material being processed. The screws may be single-start or multi-start.

BRIEF DESCRIPTION OF THE DRAWINGS

The invention will now be described, by way of illustration only, with reference to the accompanying drawings in which.

DETAILED DESCRIPTION OF THE INVENTION

As illustrated, the extruder comprises two intermeshed screws 1 and 2 mounted within a barrel 3, which may or may not be jacketed, and driven by a motor and drive gear assembly 4. The two screws are oppositely threaded and closely intermeshed with each other. When one screw rotates clockwise, the other screw rotates anticlockwise. The screws shown are single-start screws, but they may even be multi-start ones.

Figure 4:
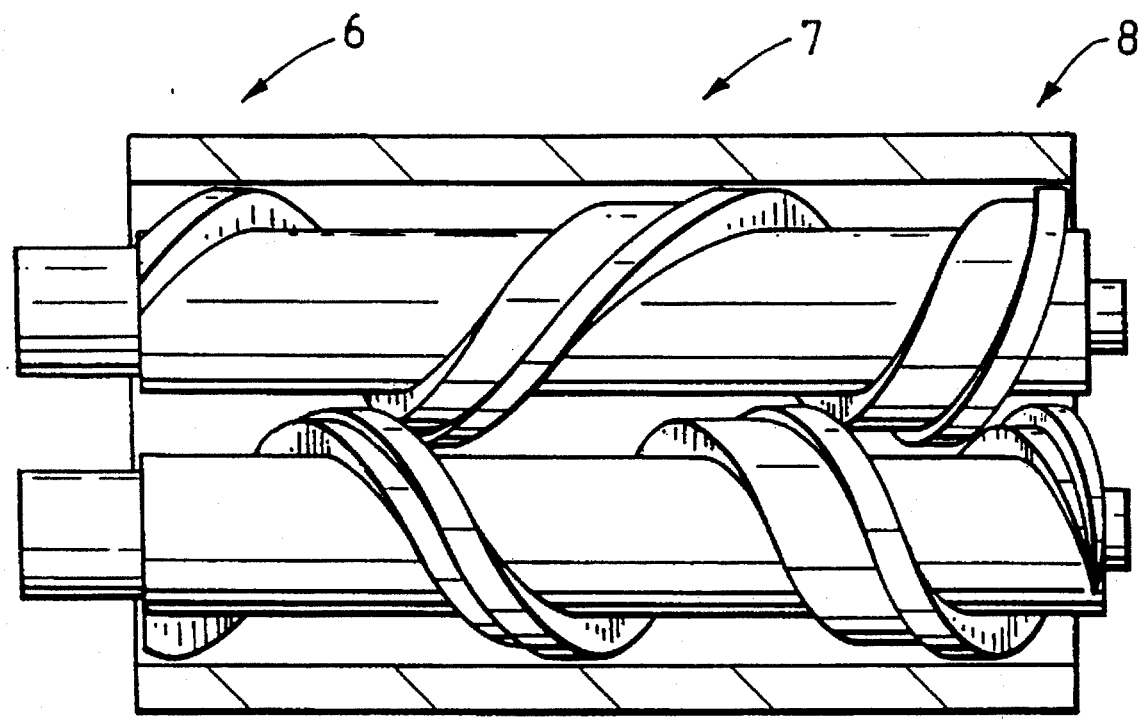
Figure 5:
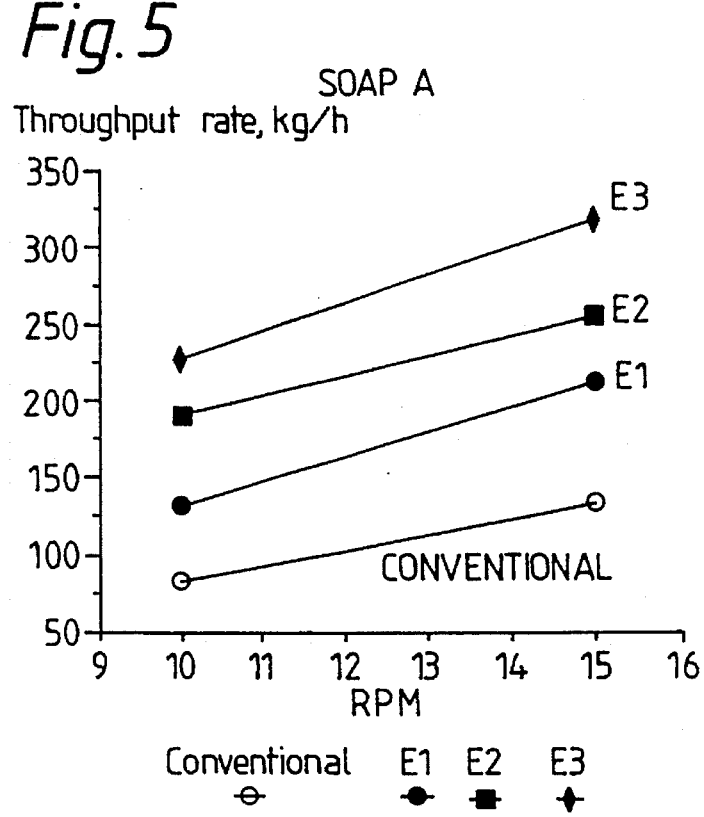
FIG. 5–11 show, in graphical form, the results of experiments carried out with an extruder according to the invention.
Figure 6:
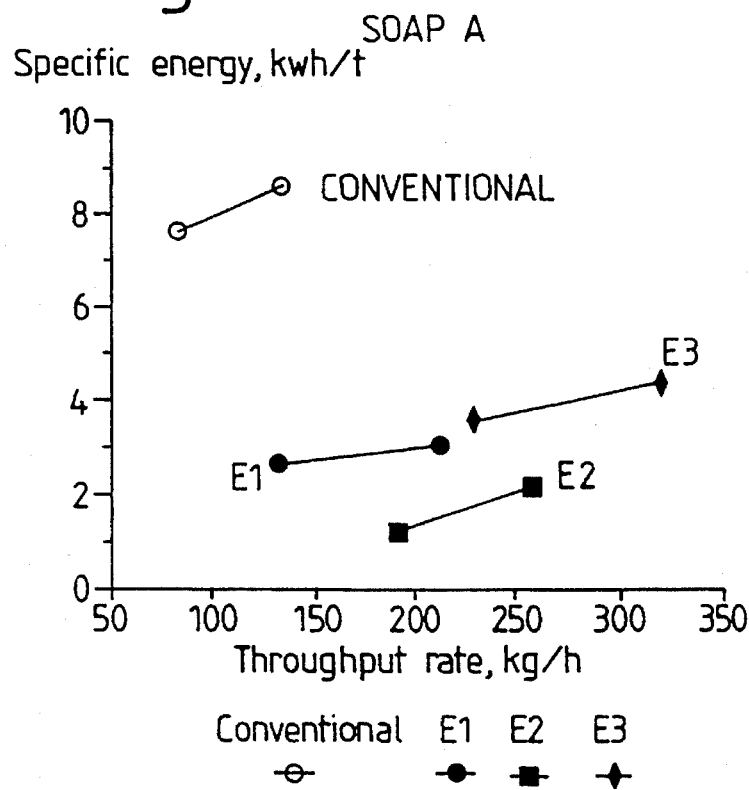

The screws of the present invention are substantially intermeshed in the discharge zone 8 (FIG. 4). In a typical extruder the discharge zone is subjected to maximum operating pressure and therefore in hitherto used extruders most of the shear degradation of processed mass, heat dissipation and consequent temperature rise, as well as loss of throughput owing to internal circulation takes place in this zone. However, in the present invention the substantially intermeshed discharge zone ensures a plurality of substantially closed C-shaped chambers which enable the soap/detergent material to be transported positively, with minimal internal circulation and hence at higher throughput rate and relatively gently with minimal structural degradation of product and minimal heat dissipation as well as temperature rise. Preferably, the length of the substantially intermeshed feed zone is from 1 to 3 times the "lead" of the screw and more preferably from 1.5 to 2.5 times the screw lead, to obtain adequate positive displacement type pumping action without excessive power requirements to operate the screw.

In an operating extruder there is a need for compacting discrete particulate or lumpy mass into a homogeneous extrudate. This may be achieved by varying the cross-sectional profile of the screws from adjacent the feed end 6 to adjacent the discharge end 8 in such a way (see FIG. 4) that the flight width increases gradually/progressively from the discharge zone to the feed zone preferable by more than 50%. At the same time, the pitch angle of the screws may also be changed optionally to improve the compaction. It is preferable to have the pitch angle from 8 to 20 degrees, more preferably from 8 to 18 degrees, adjacent the discharge end and from 8 to 30 degrees, more preferably from 8 to 18 degrees, adjacent the feed end.

FIG. 4, shows 'non-matching' screws in which the trailing flank of the flight of one screw is in close proximity with the adjacent leading flank of the flight of the second screw. This is achieved by having the mean position of the flight of one screw aligned with the centre of the corresponding channel of the second screw adjacent the discharge end but changing the pitch angle of one of the screws more rapidly along the length of the transition zone 7 (see FIG. 4).

At feed end of the extruder is provided a hopper 5, through which the soap material enters the extruder. At the other end of the extruder are mounted conventional fittings (not shown) such as a perforated plate with or without wire mesh screen, pellet cutter, cone and an eye plate in desired combination depending upon the desired form of the product such as pellet or billet or bar.

The total length of the screws, which is the sum of the length of the feed zone 6, transition zone 7 and discharge zone 8 (FIG. 4) is preferably 2 to 8 times the diameter, more preferably 3 to 8 times the diameter. Longer length is beneficial for pumping characteristics. But longer length may also result in higher power consumption per unit throughput rate and certainly results in higher capital costs. Hence it is most preferable to have the total screw length from 3 to 5 times the diameter.

In order to minimise the power requirements and heat dissipation it is desirable to reduce the friction between the "land" of the screw and the barrel. Therefore, in a preferred embodiment of the invention the broad "land" of the screw, especially in the discharge and transition zones is stepped down on the trailing edge as shown in FIG. 4.

Figure 2:
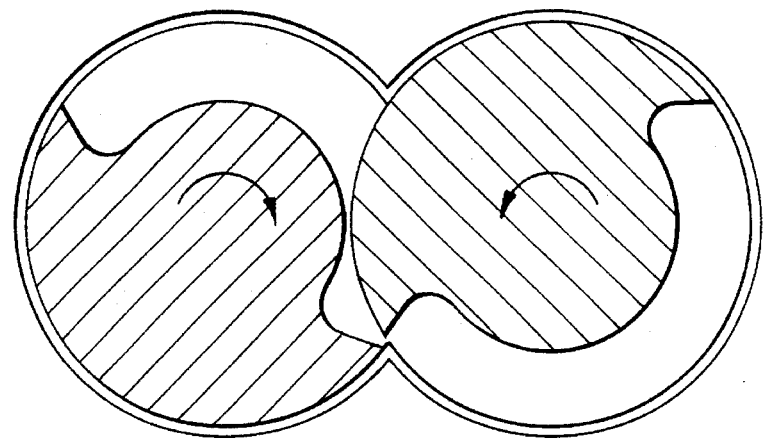
FIG. 2. shows a cross-sectional view of a typical extruder/barrel assembly with fully intermeshed counter rotary screws.
Figure 3:
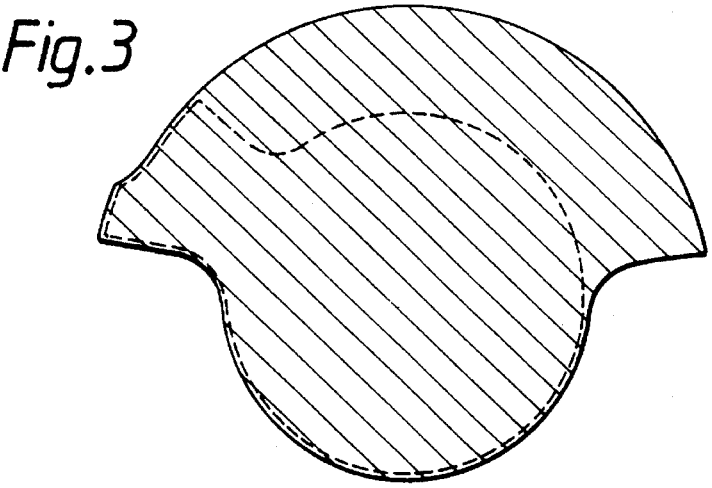
FIG. 3. shows a transverse cross-sectional profile of the screws according to an embodiment of the present invention; the dotted line showing the screw profile at the feed zone and the solid line showing the screw profile at the discharge zone, and FIG. 4. shows a top view of two intermeshed screws according to a preferred embodiment of the present invention.

In order to reduce the cost of manufacture of the equipment so that its use in soap/NSD bar industry becomes economically justifiable the screws are made at least partly by casting process. A reasonable length to diameter ratio as stated above and adequate rotational (as well as translational) clearance between the screws makes it possible to adopt the low cost casting process for manufacture of the worms in the present invention. The clearance between the screws is fully defined by the transverse cross-sections of screws. FIG. 2 shows typical transverse cross-section of screws which are fully intermeshed with minimal clearance. FIG. 3 shows typical transverse cross-section of a screw in the present invention which has a reduced cross-sectional (hatched) area. This relaxation in transverse cross-section geometry results in corresponding increase in the rotational (and translational) clearance between the screws. Preferably, the nominal rotational clearance between screws, in the discharge zone, on the basis of the nominal transverse cross-section geometry is greater than 5°. Such a clearance not only permits use of low cost casting technology for manufacture of worms but also tolerates the play and backlash in the low cost drives of conventional tangential twin worm plodders.

While the extruders described above all have single-stage extruder mechanism, it will be appreciated that the invention may equally be carried out using two- or other multi-stage extruders and in particular those which correspond to multi-stage vacuum plodders or refiners.

Figure 1:
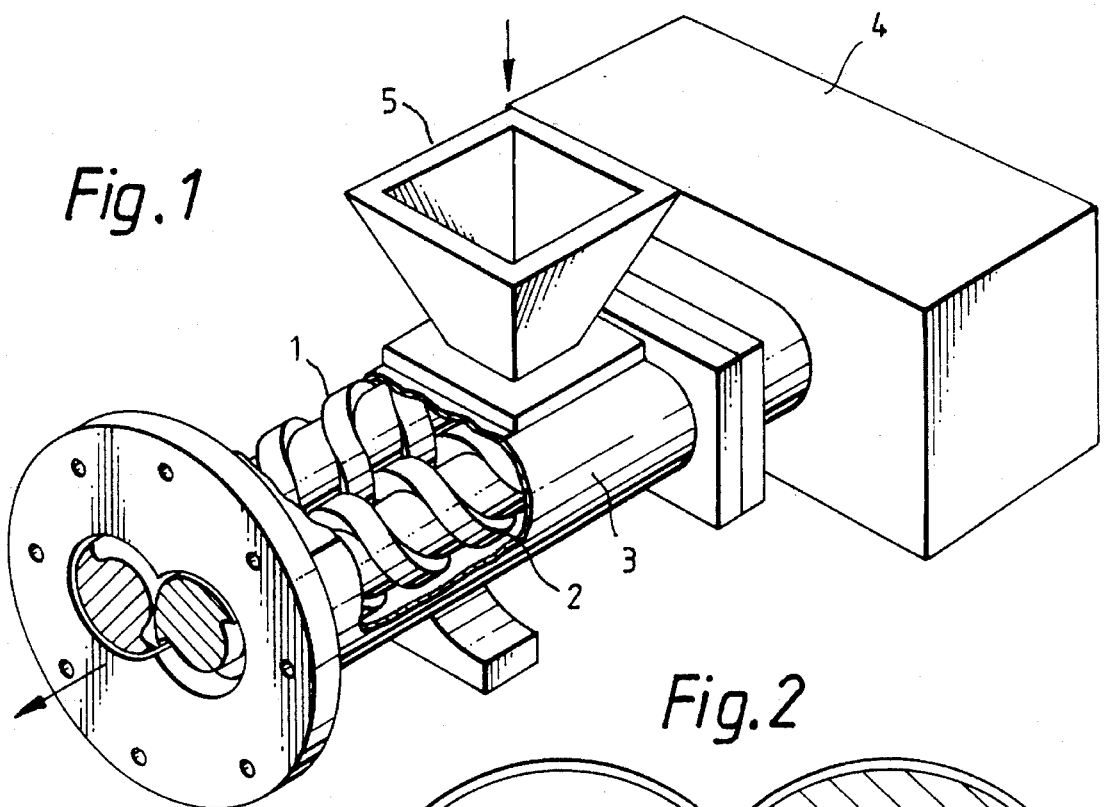
FIG. 1. shows a schematic view of a typical intermeshed counter rotary twin screw extruder with an open sectional view of the screws.

During processing the two worms are counter-rotated by the motor and drive gear assembly 4 (FIG. 1). The feedstock in hopper 5 (FIG. 1) is nipped into the feed zone 6 (FIG. 4) of the worms. The lumpy and particulate feed mass is transported by the worms into the transition zone, by the portion of screws in the feed zone. The processed mass is compacted and transported into the discharge zone by the portion of screws in the transition zone. As the screws rotate, the material in each of said closed C-shaped cavities is transported linearly and pushed through the holes in the perforated plate in the form of rods which are welded together in the cone and a bar of the required cross-section emerges continuously from the eye plate. If the desired product form is noodles then only a perforated plate (with or without refiner wire mesh screens) is used as end fitting. The processed mass is discharged as noodles through the holes of the perforated plate. Where pellets are desired then a rotary cutter is employed to chop the discharged noodles into pellets. If the desired product form is bars or billets then a cone and eye plate (die) are employed as end fittings with or without the perforated plate. The processed mass being pushed forward by the discharge zone of the screws is fused and shaped into a bar or billet form as it extrudes out of the cone and the eye plate.

It has been surprisingly found that in spite of the short length of the screws employed (as described earlier) and the clearances provided between the screws (for reasons explained earlier) the pumping characteristics of the screws in the present invention are far superior than any of the previously tested plodder worms which are part of the prior art. The worms of the invention give higher throughput rate at any rotational speed and irrespective of rheology or formulation of the soap/NSD product.

It has also been surprisingly found that, unlike single screw or tangential twin screw plodders which require use of refrigerated coolants at less than 15° C., preferably less than 10° C., for cooling the barrel to prevent mass rotation and drastic reduction in throughput rate of soap, the extruder of the present invention can be operated satisfactorily without the use of a coolant. One may optionally use a coolant of appropriate temperature say from 5° C. to 35° C. to achieve cooling and temperature control of the product but it is not essential for the pumping action of the extruder. The elimination of the need to use refrigerated coolants not only reduces the operating costs it may also eliminate the need to make investment in a refrigeration plant and reduce capital cost.

It has also been surprisingly found that in spite of the higher throughput rate of the extruder of the present invention, the specific power consumption is far less as compared to the presently used single screw or tangential twin screw plodders. This not only results in lower operating costs but may also result in reduction in capital cost per unit of throughput rate of plodder itself by enabling derating of the drive assembly which accounts for more than 60% of the cost of the plodder.

The following example is provided to illustrate the invention.

EXAMPLE

Experiments were carried out to compare the performance of a single stage plodder as per the present invention and a conventional plodder using two different Soap/Detergent bar formulations.

Four different pairs (El, E2 and E3 and comparative E*) of worms were tested and their pitch angles and other characteristic features are shown in the following Table 1:

| Prototype No. | Worm | No. of turns adjacent the discharge end | Helix angle, ° Dishcarge zone | Middle zone | Feed zone | Matching type | Flight cross-section |
|---|---|---|---|---|---|---|---|
| E1 | L-handed | 1 | 18 | ~45 | 27 | Self wiping | Step down on trailing edge |
|  | R-handed | 1 | 18 | ~22 | 27 |  |  |
| E2 | L-handed | 1½ | 18 | ~25 | 16 | Self wiping | No step down |
|  | R-handed | 1½ | 18 | ~17 | 16 |  |  |
| E3 | L-handed | 1½ | 12 | ~15 | 12 | Self wiping | No step down |
|  | R-handed | 1½ | 12 | ~12 | 12 |  |  |
| E* | L-handed | 1½ | 18 | ~17 | 16 | Centre matched | No step down |
|  | R-handed | 1½ | 18 | 17 | 16 |  |  |

Both the plodders were designed for operation using counter-rotating drives with 100 mm centre to centre distance between output shafts. The worms of both plodders had an identical channel depth of 25 mm. The total lengths of the worms of both the plodders were identical i.e. ~500 mm. The pitch angle of the conventional tangential worms was varied from 12.6° in the feed zone to 9.0° in the discharge zone as per the long known optimised art. The pitch angle of the experimental plodder worms was varied from 12°–27° in the feed zone to 12°–18° in the discharge zone (see Table 1). The flight width of the experimental worms was also reduced by approximately 60% from discharge zone to the feed zone. The land of the worms E1 was stepped down by 5 mm on the trailing edge to reduce friction between land and the barrel. The length of the discharge zone of the worms E1 was equal to one "lead" of the screw. The length of the discharge zone of the worms E2 and E3 was equal to one and a half "lead" of the screw. Their length to diameter ratio was 4.0. The nominal rotational clearance on cross-sectional geometry of the worms in the fully intermeshed discharge zone was approximately 10°. The worms were made employing the low cost process for manufacture of the conventional worms involving the use of casting technology.

Three toilet soap formulations namely, A, B and C, containing sodium salts of fatty acids as surface active agents in the form of noodles were used as feedstock in the first set of experiments.

Formulations of Soaps used for the Experiment were as Follows;

| SOAP A | |
|---|---|
| 78% | Total fatty matter |
| 1.3% | Perfume |
| 12.0% | Water |

Colour, TiO2 tO 100%

| SOAP B | |
|---|---|
| 50% | Sodium Cocyl isethionate |
| 20% | Stearic Acid |
| 5% | Sodium isethionate |
| 4% | Coconut fatty acid |
| 5% | Water |
| 1.65% | Perfume |
| 8.3% | 82/18 coconut/tallow soap |
| 3.0% | Sodium Stearate |

| -continued SOAP B | |
|---|---|
| 2.0% | Linear alkyl benzene sulphonate |

Colour, salt, TiO$_2$ t0 100%

| SOAP C | |
|---|---|
| 73.9% | 82/18 Coconut/tallow soap |
| 8.9% | C$_{16}$–C$_{18}$ Nonionic ethoxylate with 20 EO |
| 3.6% | Palm Kernel fatty acid |
| 13.0% | Water |
| 0.6% | Salt |

Temperature of water used to cool the barrel of the plodder according to the invention was varied from 7° C. to 30° C. Temperature of water used to cool the barrel of the conventional plodder was varied from 14° C. to 30° C. The temperature of the feed noodles was around 28°–33° C. Several runs were carried out on each plodder. The throughput rates, specific energy consumption, sensitivity to coolant temperature, plastic yield stress, etc. were measured using conventional methods.

In a second set of experiments, a non-soap detergent (NSD) dough (with ingredients consisting of 22% linear alkyl benzene sulphonic acid, 4% soda, 8.3% kaolin, 42% calcite, 6% inorganic structurants, 1.5% anhydrous alkaline silicate, 8.3% STPP, 6% moisture and small amounts of perfume, colour, TiO$_2$, etc.) was prepared in a large sigma mixer in batches of 30 or 40 kg each. As soon as the dough was prepared, it was made into noodles using a noodler.

The freshly prepared noodles were used without delay, to prevent cooling and hardening, as feedstock to study only the pumping characteristics of the new plodder. Cooling water at 30°–31° C. was used to cool the barrels of the plodder according to the present invention and the conventional plodder. The temperature of the feed noodles was 39°–45° C. depending on the batch.

Figure 7:
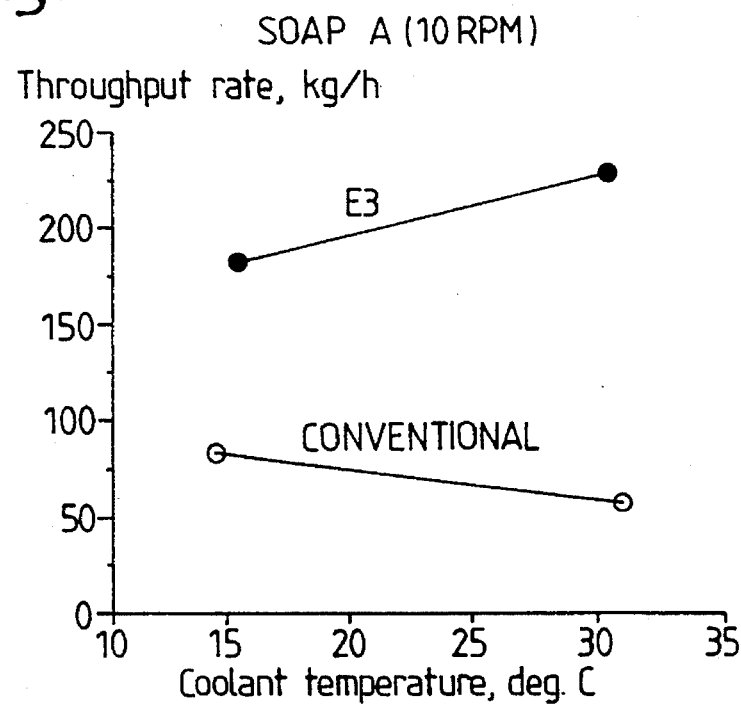
Figure 8:
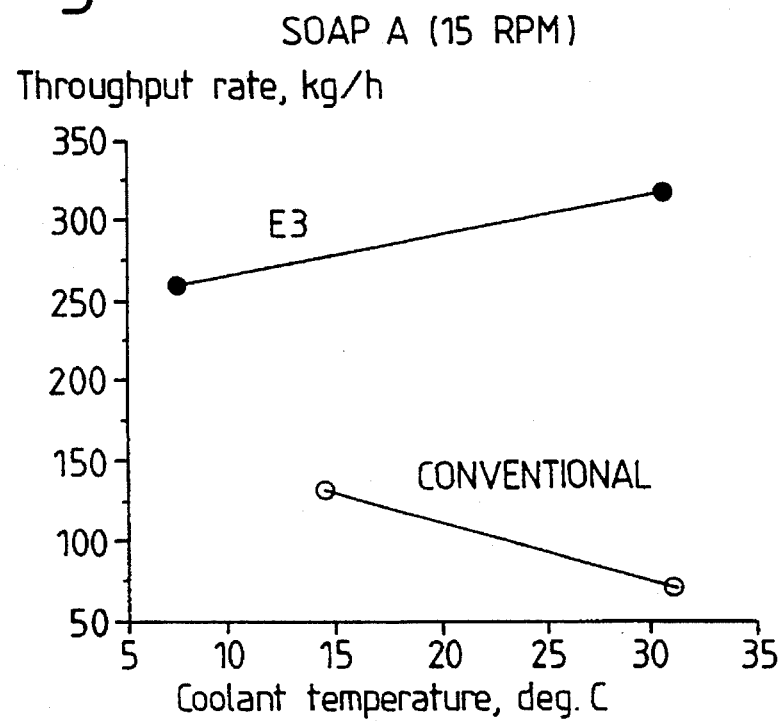
Figure 9:
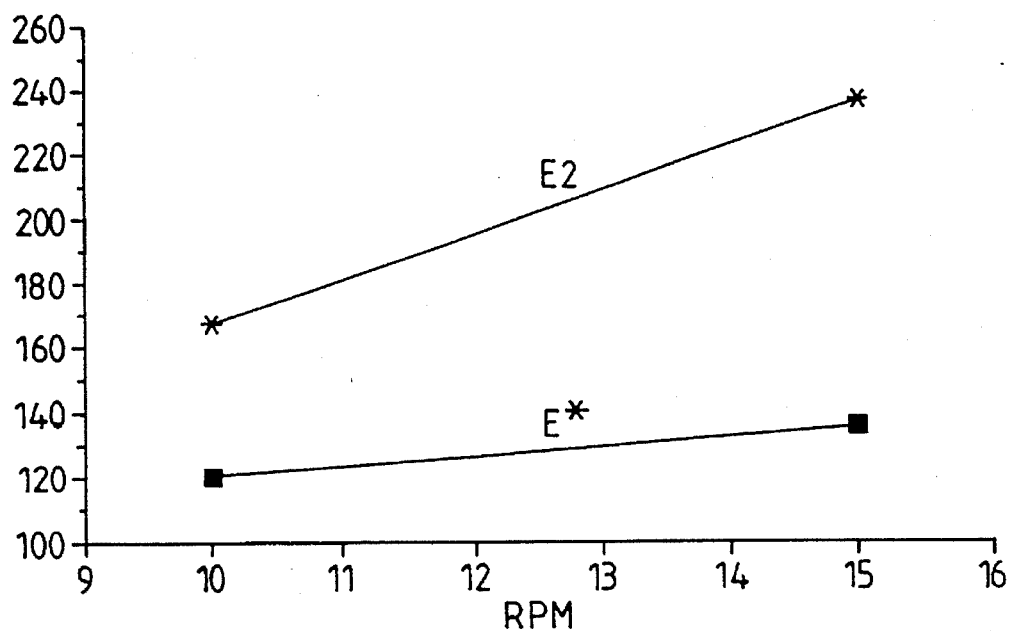
Figure 10:
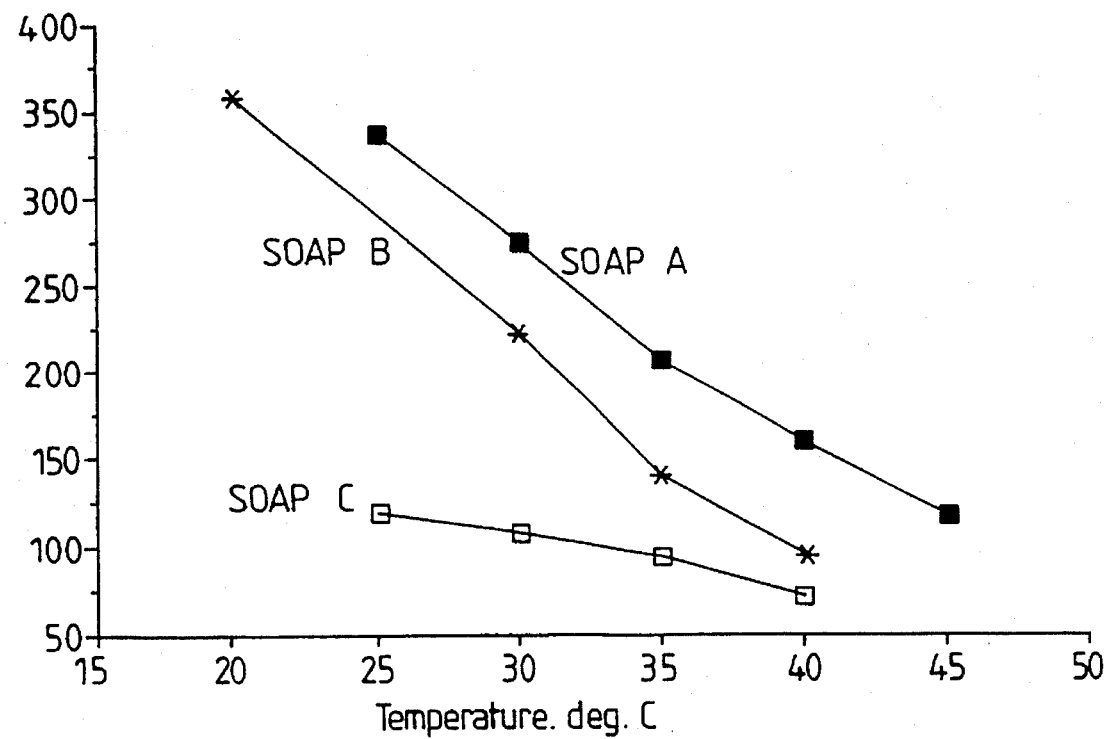
Figure 11:
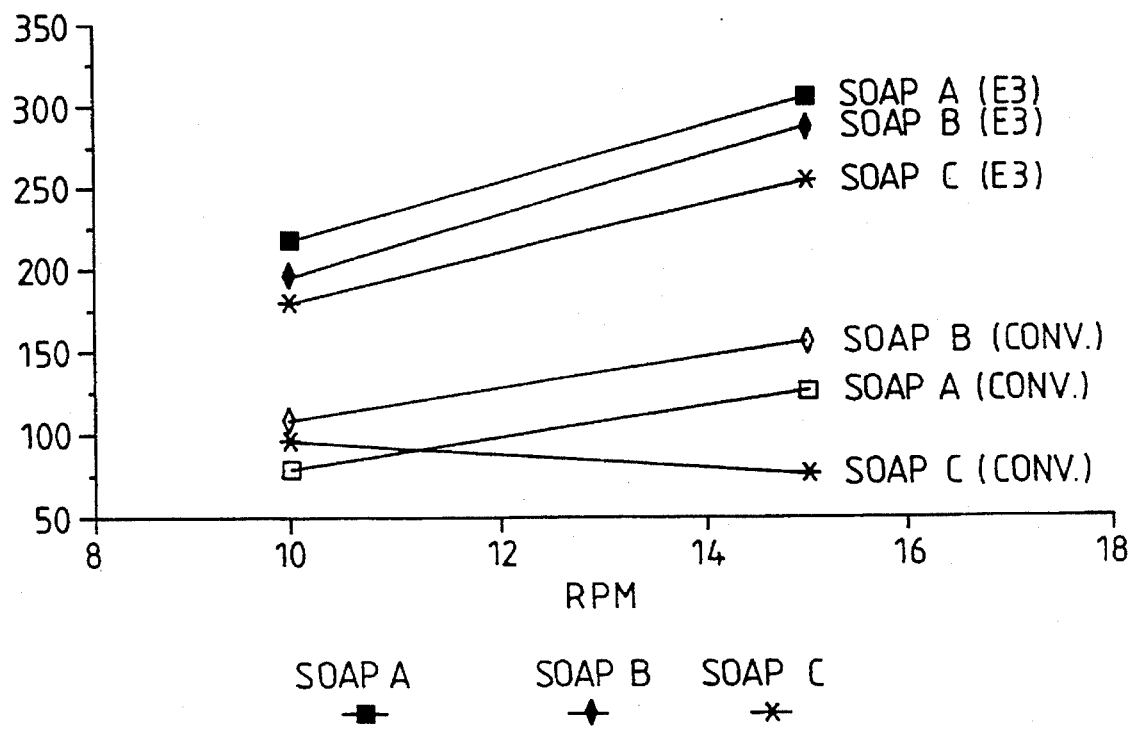

In the case of the soaps, A, B and C the throughput of the new plodder was 1.5 to 2.5 times higher that of the conventional plodder and the specific energy consumption of the new plodder was 50–85% lower than that of the conventional plodder (see FIGS. 5–9). The temperature rise from feed to extrudate was nearly the same for both the plodders even when coolant temperature of the new plodder was 30° C. and coolant temperature of the conventional plodder was 15° C. This proves that chilled (refrigerated) water can be replaced by cooling water at ambient temperatures in the case of the new plodder. FIGS. 7 and 8 clearly demonstrate that the new plodder can be operated satisfactorily even without chilled (refrigerated) water to cool the barrel whereas when the conventional plodder is operated with unrefrigerated water to cool the barrel, there is a drastic reduction in throughput rate due to mass rotation within the plodder. This further demonstrates that the new plodder has a high degree of positive displacement action as compared to the conventional plodder. FIG. 9 demonstrates the advantage of using a plodder with non-matching screws (E2) over one with matching screws (E*). FIG. 11 illustrates that the new plodder gives higher throughput rates at any rotational speed and irrespective of the rheology (FIG. 10) or formulation of the soap. This is further supported by the data for NSD bars shown in Table 2 which shows that the throughput rate of the new plodder is 1.5 times higher than that of the conventional plodder and the specific energy consumption is 30% lower than that of the conventional plodder.

TABLE 2

| | DETERGENT (NSD BAR) | |
|---|---|---|
| | E3 | CONVENTIONAL PLODDER |
| TEMP. OF COOLANT, DEG. C. | 31 | 30 |
| NET POWER, KW | 1.45 | 1.43 |
| THROUGHPUT, KG/H | 197 | 136 |
| SPECIFIC ENERGY, KWH/T | 7.4 | 10.5 |

While the plodder/extruder according to the invention has been described with particular reference to the manufacture of soap/detergent forms, it should be understood that it can be employed in other fields.

We claim:

1. Apparatus for the manufacture of soap forms comprising a twin screw, intermeshing counter-rotating extruder, said screws being oppositely threaded, non-matching and such that the ratio of the length to diameter of each screw is independently greater than 1:1; said screws further being mounted for rotation within a barrel, the barrel having a first feed end and a second discharge end, each screw independently having a cross-sectional profile which varies from feed end to discharge end of the barrel such that the flight width increases from discharge end to feed end by more than 50%, the rotational clearance between the screws adjacent the discharge end being at least 5°, and the screw-to-barrel clearance such that as the feedstock passes along at least a part of the barrel from said first end towards said second end, it is divided into a plurality of discrete, substantially C-shaped segments bounded by the screw and barrel surfaces and conveyed into a path whereby the bulk of the feedstock moves substantially parallel to the rotational axis of the screws.

2. A process for manufacture of soap forms which includes the step of treating a soap/detergent feedstock by passage through a twin screw, intermeshing counter-rotating extruder, said screws being oppositely threaded, non-matching and such that the ratio of the length to diameter of each screw is independently greater than 1:1; said screws further being mounted for rotation within a barrel, the barrel having a first feed end and a second discharge end, each screw independently having a cross-sectional profile which varies from feed end to discharge end of the barrel such that the flight width increases from discharge end to feed end by more than 50%, the rotational clearance between the screws adjacent the discharge end being at least 5°, and the screw-to-barrel clearance such that as the feedstock passes along at least a part of the barrel from said first end towards said second end, it is divided into a plurality of discrete, substantially C-shaped segments bounded by the screw and barrel surfaces and conveyed into a path whereby the bulk of the feedstock moves substantially parallel to the rotational axis of the screws.

3. Apparatus according to claim 1 wherein the pitch angle of the screws changes from a value in the range 8° to 20° adjacent the discharge end of the barrel to a value in the range 8° to 30° adjacent the feed end of the barrel whereby the trailing flank of the flight of the first screw is adjacent the leading flank of the second screw.

4. Apparatus according to claim 1 wherein the first screw has a smaller variation in pitch angle in the area adjacent the feed end and discharge end than the second screw.

5. Apparatus according to claim 1 wherein the ratio of the length to diameter of each screw is independently in the range 3 to 8.

6. Apparatus according to claim 1 further comprising cooling means to cool the feedstock within the barrel.

7. Apparatus according to claim 6 wherein the cooling means include means for circulating cooling fluid through passage within one or both screws.

8. Apparatus according to claim 6 wherein the cooling means include means for circulating a cooling fluid through a cooling jacket around the barrel.

* * * * *